(12) United States Patent
Patterson

(10) Patent No.: US 6,802,488 B1
(45) Date of Patent: Oct. 12, 2004

(54) ELECTRO-MECHANICAL COAXIAL VALVE

(75) Inventor: Paul R. Patterson, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 91 days.

(21) Appl. No.: 10/232,974

(22) Filed: Aug. 30, 2002

(51) Int. Cl.[7] ............................................. F16K 11/00
(52) U.S. Cl. ................... 251/129.11; 251/267; 251/347
(58) Field of Search ..................... 251/129.11, 129.01, 251/344, 347, 267, 71

(56) References Cited

U.S. PATENT DOCUMENTS

| | | | | |
|---|---|---|---|---|
| 688,314 | A | * 12/1901 | Kemp | ......................... 251/347 |
| 2,109,197 | A | * 2/1938 | Humason | ..................... 175/234 |
| 2,488,647 | A | * 11/1949 | Teague, Jr. | ................... 251/344 |
| 2,657,895 | A | * 11/1953 | Huber et al. | ................. 251/347 |
| 3,137,475 | A | 6/1964 | Schoenecker et al. | |
| 3,152,785 | A | 10/1964 | Zeitlin | |
| 3,176,720 | A | 4/1965 | Donahue | |
| 4,917,137 | A | * 4/1990 | Symmons | .................... 251/267 |
| 5,179,977 | A | * 1/1993 | Iwata et al. | ............. 251/129.11 |
| 6,223,774 | B1 | 5/2001 | Fournier et al. | |
| 6,257,271 | B1 | * 7/2001 | Babin et al. | ........... 251/129.11 |
| 6,349,922 | B1 | * 2/2002 | Rydin | ..................... 251/129.11 |

* cited by examiner

Primary Examiner—J. Casimer Jacyna
(74) Attorney, Agent, or Firm—James J. McGroary; Norman L. Wilson, Jr.

(57) ABSTRACT

Coaxial valves usually contain only one moving part. It has not been easy, then, to provide for electric motor actuation. Many actuators being proposed involve designs which lead to bulky packages. The key facing those improving coaxial valves is the provision of suitable linear actuation. The valve herein includes a valve housing with a flow channel therethrough. Arranged in the flow channel is a closing body. In alignment with the closing body is a ball screw actuator which includes a ball nut and a cylindrical screw. The ball nut surrounds a threaded portion of the cylindrical screw. The cylindrical screw is provided with a passageway therethrough through which fluid flows. The cylindrical screw is disposed in the flow channel to become a control tube adapted to move toward and away from the valve seat. To rotate the ball nut an actuating drive is employed driven by a stepper motor.

4 Claims, 2 Drawing Sheets

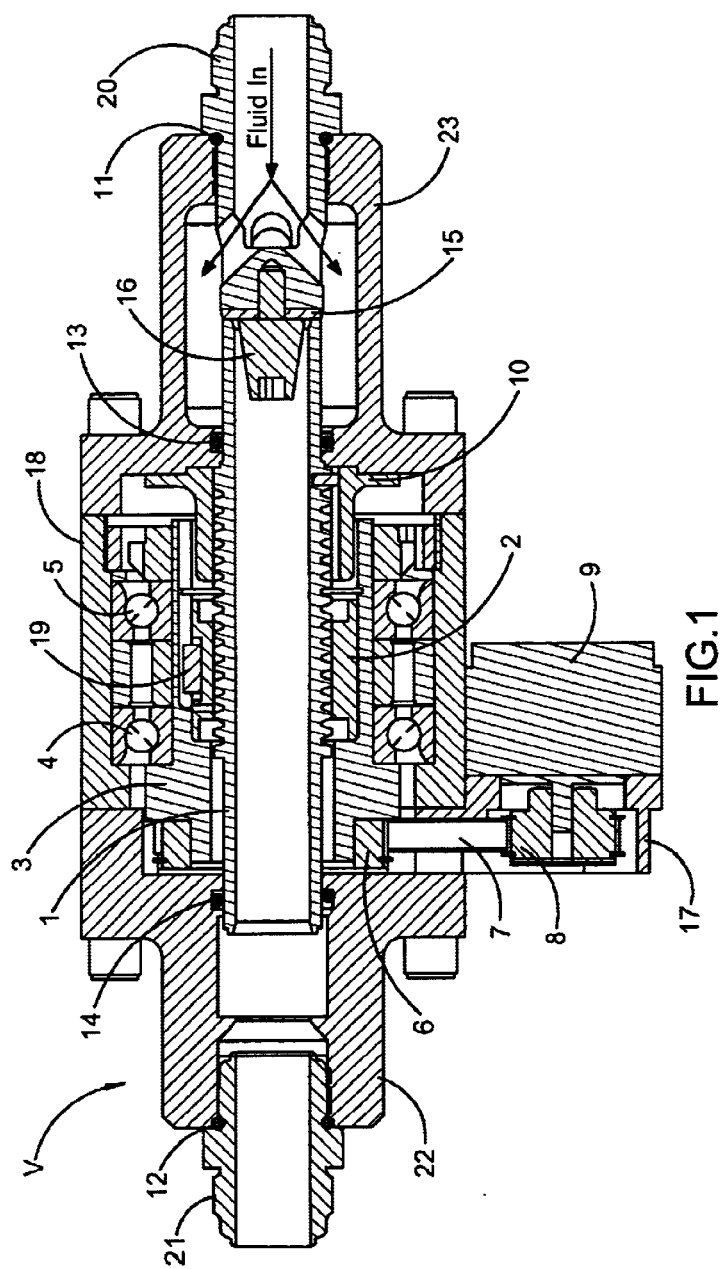
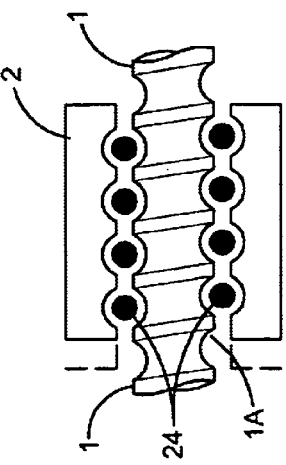

ELECTRO-MECHANICAL COAXIAL VALVE

CROSS-REFERENCE TO A RELATED APPLICATIONS

There are no applications related to this application

STATEMENT REGARDING FEDERALLY-SPONSORED RESEARCH OR DEVELOPMENT

The invention described in this patent was made by an employee of the United States Government and may be manufactured and used by or for the Government for governmental purposes without the payment of any royalties.

1. Field of the Invention

This invention relates to a coaxial valve which is especially suited for use in propulsion in aircraft and spacecraft for the control of flow of liquids and gases under conditions wherein solenoids are not as effective.

2. Background of the Invention

The most significant use for coaxial valves is in their high flow capability and pressure balanced control element. This means that hydraulic forces against the control element remain balanced in both open and closed positions and the transition between, allowing smooth, controlled, predictable and fast actuation speeds. The valves operate by urging against a valve seat a cylinder through which the working medium flows.

Coaxial valves are commercially available, but such valves are actuated by electromagnetic coils, compressed air, helium under pressure, or hydraulic fluids. Since coaxial valves usually contain only one moving part it has not been easy to provide for electric motor actuation. These difficulties will be apparent from a reading of a Martin Roth et al Application 20010011715 published in the United States. The valve described is a coaxial valve including a housing with an inlet and an outlet connected by a flow passage, along with a valve sleeve arranged in that flow passage. The actuating drive is a servomotor which is fixed to the valve housing. A recirculating ball nut assembly or a planetary ball nut assembly is used to translate the rotary movement of the servomotor to a back-and-forth linear movement. A transmission part then transmits the linear movement of the actuator to the valve sleeve. This transmission part is in the form of an adjusting lever. The adjusting lever is a rocking lever having one end coupled to the actuator, its other end coupled to the valve housing, and its center portion coupled to the valve sleeve. Considering the number of additional components, and bearings which are included for efficient operation, it can be seen that the use of a motor in conjunction with a coaxial valve is not without its drawbacks.

European Patent Application Publication EP-OS 0 257 906 referred to in the published Roth et al application discloses an axially-movable seat body driven by an electric motor. In this arrangement a spindle/nut is used. To operate the valve the rotor of the electric motor largely makes use of the cross section of the flow channel. But to do so the rotor itself is located in the flow stream of the conveying medium. It is pointed out in U.S. Application 20010011715 that such an arrangement is associated with several disadvantages. The units (bearing, rotor, gearing) which are incorporated directly in the flow channel, impair the flow, so that considerable losses in pressure have to be anticipated. Accordingly it is understandable that many valves being proposed or considered involve designs and systems which sometimes lead to bulky packages because of their mechanical features.

It is suggested, then, that there is still a need for a motor driven coaxial valve. Such a valve is provided herein.

SUMMARY OF THE INVENTION

As can be discerned from the prior art one of the challenges facing those improving coaxial valves is the requirement for suitable linear actuation.

An object of this invention is the provision of a linear actuator which is much less complex than those now in use.

Another object of the invention is to improve a coaxial valve for controlling a flow of a liquid or gaseous flow medium therethrough.

The valve herein includes a valve housing with an inlet, an outlet, and a flow channel passing in a longitudinal direction therethrough from the inlet to the outlet. Arranged in the flow channel is a closing body provided with a valve seat. In alignment with the closing body is a ball screw actuator which includes a ball nut and a cylindrical screw. The ball nut surrounds a threaded portion of the cylindrical screw. The cylindrical screw is provided with a passageway therethrough forming a cylinder through which fluid flows. The cylindrical screw is disposed in the flow channel to become a control tube allowing the flow medium to flow therethrough. The control tube is adapted to move in the longitudinal direction toward and away from the valve seat of the closing body when rotated through its ball bearings by the ball nut. One end of the control tube is adapted to abut the valve seat of the closing body when so moved. To rotate the ball nut an actuating drive is employed. This actuator is adapted to be driven by a stepper motor so that the nut rotates to advance the control tube to a closed position in which the control tube end contacts and seals against the valve seat of the closing body to close the flow channel. In addition, the nut can advance the control tube to an open position in which the control tube end is spaced a distance apart from the closing body to provide an opening between the control tube end and the closing body to allow the flow medium to flow through the control tube and through the valve housing outlet.

DETAILED DESCRIPTION OF THE INVENTION

For future space launch vehicles the use of electro-mechanically actuated valves are being proposed for controlling the flow of propellants to rocket engines. The most notable advantages of using such valves over traditional pneumatically or hydraulically actuated valves are the elimination of associated reservoirs, tanks, lines, fittings, solenoid valves, and the ability to drive multiple engine valves through a single electric engine controller. Electro-mechanically actuated valves offer precision control of valve positions. There is also a potential for reduced ground operations, improved reliability and safety, and fast vehicle turn-around times. This invention eliminates extra mechanical features such as levers by combining the function of a valve sleeve or control tube with that of a linear actuator. Position accuracy is also increased because the motor is more directly coupled to the control tube. In one embodiment the actuator drive includes a stepper motor and a ball nut retainer. The ball nut is keyed to a ball nut retainer so that the nut rotates with the ball nut retainer to advance the control tube. Equally important, loads from the motor drive as well as hydraulic loads on the control tube are transmitted through a coupling nut along the entire circumferential area of the outer screw of the control tube rather than on two sides of the control tube as in the prior art. This reduces the potential for jamming. These and other features of the coaxial valve of this invention will become apparent from a description of the valve in conjunction with the accompanying drawings.

BRIEF DESCRIPTION OF THE DRAWINGS

FIG. 1 is a cross-sectional view of the coaxial valve showing the control tube in its closed position so that there is no flow of liquid or gaseous medium.

FIG. 2 is a cross-sectional sketch illustrating the ball screw in greater detail.

DESCRIPTION OF A PREFERRED EMBODIMENT

Figure 3:
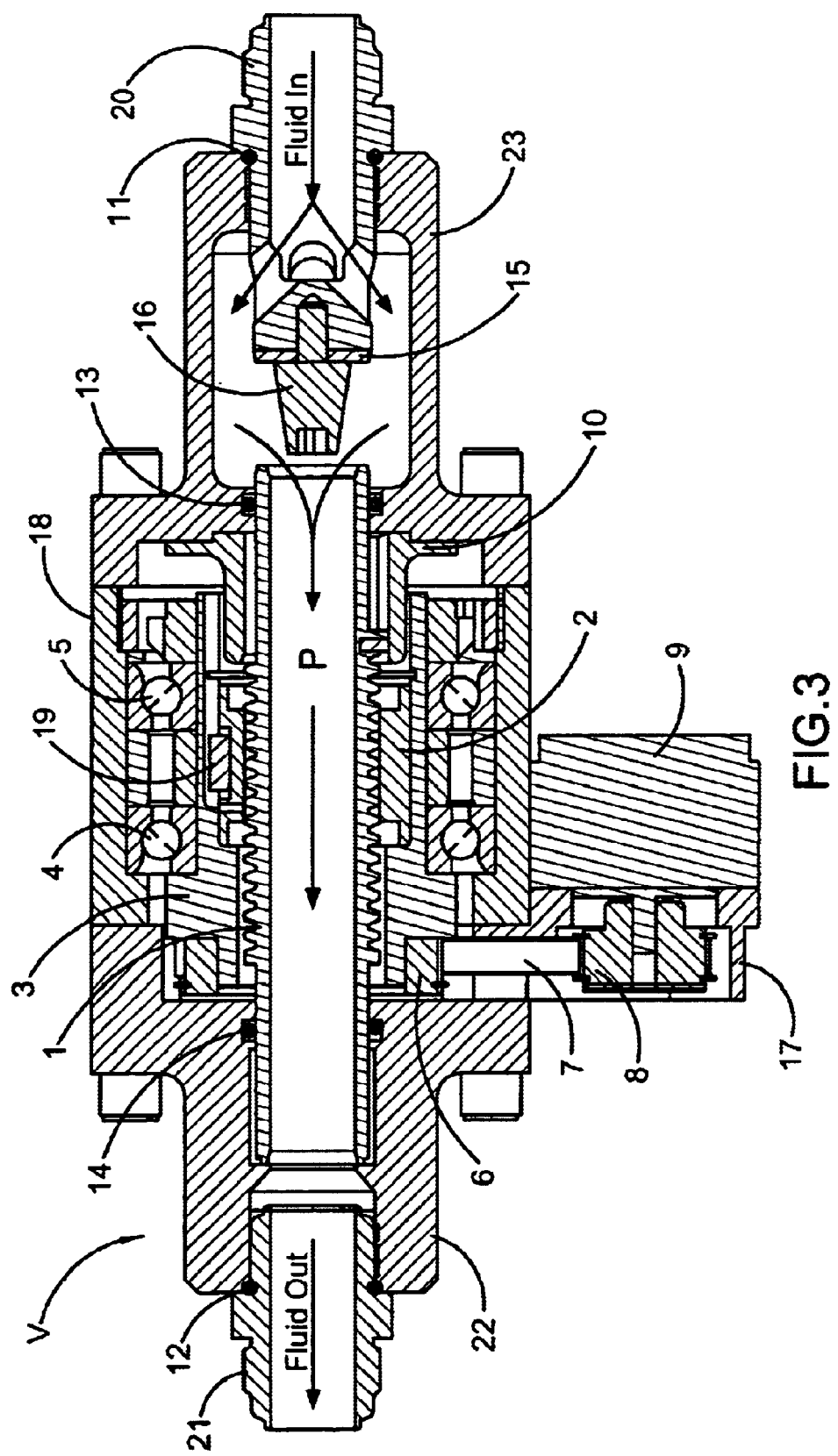
FIG. 3 is a cross-sectional view of the coaxial valve showing the control tube in its open position so that liquid or gaseous medium can flow through the valve from the valve inlet to the valve outlet.

As illustrated in FIG. 1 a motor 9 is connected to the valve, V, through a drive pulley 8, timing belt 7, and driven pulley 6. Motor 9 is supported by a bracket 17 bolted to the valve body 18. A driven pulley 6 is bolted to a sleeve 3 that also houses a ball nut 2. Sleeve 3 is mounted in bearings 4 and 5 fixed in valve body 18. Ball nut 2 is retained and made to rotate with the sleeve 3 by use of a key 19. Passing through ball nut 2 is a hollow cylindrical ball screw 1 that functions as both a valve actuator and a flow passage for be valve. Ball screw [or control tube] 1 is keyed to the valve body through an anti-rotation device 10 that prevents rotation of the ball screw, but allows the ball screw to translate axially in the valve when the ball nut 2 is rotated Ball screw [i.e., control tube] 1 has a precision ground or rolled external helical groove or threads 1A acting as an inner race. Ball nut 2 has internal grooves or threads that act as an outer race. Precision steel balls 24 rotate in the grooves or threads between the nut and the [cylindrical] screw [or control tube]. Since these elements are too small to be adequately illustrated in FIGS. 1 and 3, they are shown in FIG. 2, which has been enlarged to show such details. When ball nut 2 is rotated, ball screw 1 moves in a linear direction. This converts torque to thrust. Ball screw 1 is only threaded at its center section and its ends have been polished to act as dynamic sealing surfaces for the valve. Seals 11, 12, 13, and 14 are installed on inlet fitting 20, on outlet fitting 21, and on the ends of the ball screw at 13 and 14 to prevent external leakage of the valve. A valve seat 15 is disposed on inlet fitting 20 by a retainer 16 that has been contoured to achieve particular flow characteristics according to ball screw positions as the valve is actuated.

Referring more specifically to FIG. 1, the valve V is shown in the closed position where ball screw 1 has been driven against the main valve seat 15 shutting off the flow of fluid. In this position there is little force required to maintain the ball screw 1 against the seat because the push bore area available for pressure to act upon has been minimized and the valve is force balanced. Motor 9 will position and hold ball screw 1 against the main seat 15 providing the force necessary for sealing. In the closed position of FIG. 1 fluid under pressure enters the inlet fitting 20 and flows into the chamber in the inlet housing 23. Fluid cannot flow, since the valve is sealed at the main valve seat 15. Leakage is prevented by seals 11 and 13.

Referring now to FIG. 3, to open the valve to a particular position, motor 9 will be commanded to rotate a particular number of revolutions at a particular rate of rotation within its torque limitations. Motor 9 will then drive the belt and pulley arrangement 6, 7, and 8, along with sleeve 3 and ball nut 2. The action rotating the ball nut 2 on the ball screw threads through ball bearings 24 will cause ball screw 1 to translate axially away from the main valve seat 15, opening the valve as shown in FIG. 3. Once the valve is open, fluid will flow through the inlet fitting 20 into the chamber in inlet housing 23, past seat retainer 16, into and through the hollow core or passageway P through ball screw 1, into outlet housing 22, and through outlet fitting 21. The net force generated from fluid pressure when in the open position is minor because in this state there is equal push bore area exposed to fluid pressure at the inlet and outlet of the ball screw, and the forces generated will be in opposing directions. Precise valve positioning is achieved because of the accuracy of the screw lead in the ball screw. It is known that for a given rotation of ball nut 2, ball screw 1 will have moved a distance equal to the lead of the screw threads to within screw lead accuracy and motor positional resolution. Stepper motors for this are well known in the art and such motors are available, as are ball screws, with sufficient positional accuracy, and resolution to meet requirements for valve positioning.

From the preceding description it can be seen that this invention provides a greatly simplified electro-mechanically actuated tube type valve. The valve requires fewer moving parts, a minimum pressure drop, and no bulky packages. In addition, with the valve, precise position control can be achieved. Such control is made possible by the accuracy of positioning capabilities of the motor and of the ball screw. The valve, then, can be driven to any position between closed and fully opened.

In the light of the foregoing description variations and ramifications of the invention will occur to those in the art. As an example, generally the valve operates when the motor is commanded to rotate by a motor drive and controller. Stepper motor controllers are readily available and an appropriate one can be selected by the user. The motor drive means described herein is a drive pulley and timing belt. Other power transmission devices such as gears will, of course, come to mind. In addition, in lieu of a stepper motor a servo motor can be used. The valve of this invention is intended to provide electronic control of the amount and rate of change of fluid flow. For such control stepper and servo motors are valuable. As another variation since the forces in the valve allow for a small motor producing relatively small torque, it will be possible to drive an array of valves of this type from a common motor. Further, the screw portion of the ball nut can be a sleeve with external threads or helical grooves instead of a screw. Other modifications will become apparent given the teachings of this invention. Such modifications are deemed to be within the scope of this invention.

What is claimed is:

1. A coaxial valve for controlling a flow of a liquid or gaseous flow medium therethrough, including: a valve body, a valve housing with an inlet, an outlet and a flow channel passing in a longitudinal direction therethrough from the inlet to the outlet; a closing body provided with a valve seat arranged in the housing flow channel; a ball screw actuator including a ball nut and a cylindrical screw, with the ball nut surrounding a threaded portion of the screw; the cylindrical screw having a passageway therethrough forming a cylinder through which fluid flows, the cylindrical screw being disposed in the flow channel to become a control tube allowing the flow medium co flow therethrough, the control tube being adapted to move in the longitudinal direction toward and away from the valve seat of the closing body when rotated by the ball nut, one end of the control tube being adapted to abut the valve seat of the closing body when so moved; and an actuating drive adapted to rotate the ball nut to advance the control tube to a closed position in which the control tube end contacts and seals against the valve seat of the closing body to close the flow channel, and to advance the control tube to an open position in which the control tube end is spaced a distance apart from the closing body to provide an opening between the control tube end and the closing body to allow the flow medium to flow through the control tube and through the valve housing outlet.

2. The coaxial valve of claim 1 wherein the actuating drive includes a servo motor and a ball nut retainer, wherein the ball nut retainer is adapted to be rotated by the servo motor, and wherein the ball nut retainer has its ball nut keyed thereto to rotate therewith.

3. The coaxial valve of clam 1 wherein the control tube is a sleeve having threads matching those of the nut affixed to a portion of it exterior.

4. The coaxial valve of claim 1 wherein ball bearings are carried between the ball nut and the control tube, wherein the actuating drive includes a stepper motor and a ball nut retainer, wherein the ball nut retainer is adapted to be rotated by the stepper motor, and wherein ball bearings are carried between the ball nut retainer and the valve body.

* * * * *